United States Patent [19]

Pokriefka et al.

[11] Patent Number: 5,510,968

[45] Date of Patent: Apr. 23, 1996

[54] BACK LIGHT ASSEMBLY

[75] Inventors: Gerald P. Pokriefka, Clarkston; Paul E. Cole, Chelsea, both of Mich.

[73] Assignee: Chrysler Corporation, Auburn Hills, Mich.

[21] Appl. No.: 520,139

[22] Filed: Aug. 28, 1995

[51] Int. Cl.$^6$ .................................................. F21V 29/00
[52] U.S. Cl. ........................ 362/294; 362/833; 362/368; 362/373
[58] Field of Search .......................... 362/80, 83.3, 294, 362/310, 362, 368, 373, 475, 285

[56]  References Cited

U.S. PATENT DOCUMENTS

| | | | |
|---|---|---|---|
| 4,503,487 | 3/1985 | Kakuda | 362/373 |
| 4,700,277 | 10/1987 | Moore | 362/368 |
| 5,461,554 | 10/1995 | Leonetti et al. | 362/294 |

Primary Examiner—Denise L. Gromada
Assistant Examiner—Y. Quach
Attorney, Agent, or Firm—Edward A. Craig

[57]  ABSTRACT

A back light assembly for an automotive vehicle comprising a housing having separable housing parts forming a chamber for a light bulb. The housing parts are releasably secured together by at least one and preferably two elongated, flexible, compressible, stretchable fasteners. Each fastener extends through aligned passages in the respective housing parts. Each fastener has two enlargements, one engageable with an abutment in the passage of one housing part and the other engageable with an abutment in the passage of the other housing part to hold the housing parts together. The distance between the enlargements in the unstretched, free state condition of the fasteners, before installation, is less than the distance between the abutments, so that when installed, the fasteners are stretched and in tension. One of the enlargements of each fastener is adapted to engage the rear window of the vehicle when the back light assembly is properly mounted. The light bulb assembly comprises a channel-shaped supporting frame having side flanges which extend through slots in the front wall of the housing into the housing chamber. A light bulb on the base of the frame extends through an aperture in the front wall of the housing into the chamber. A resilient clip on the housing has a latching element provided with a shoulder adapted to snap over the frame to releasably retain the light bulb assembly. The supporting frame also serves as a heat shield for heat generated by the light bulb.

7 Claims, 5 Drawing Sheets

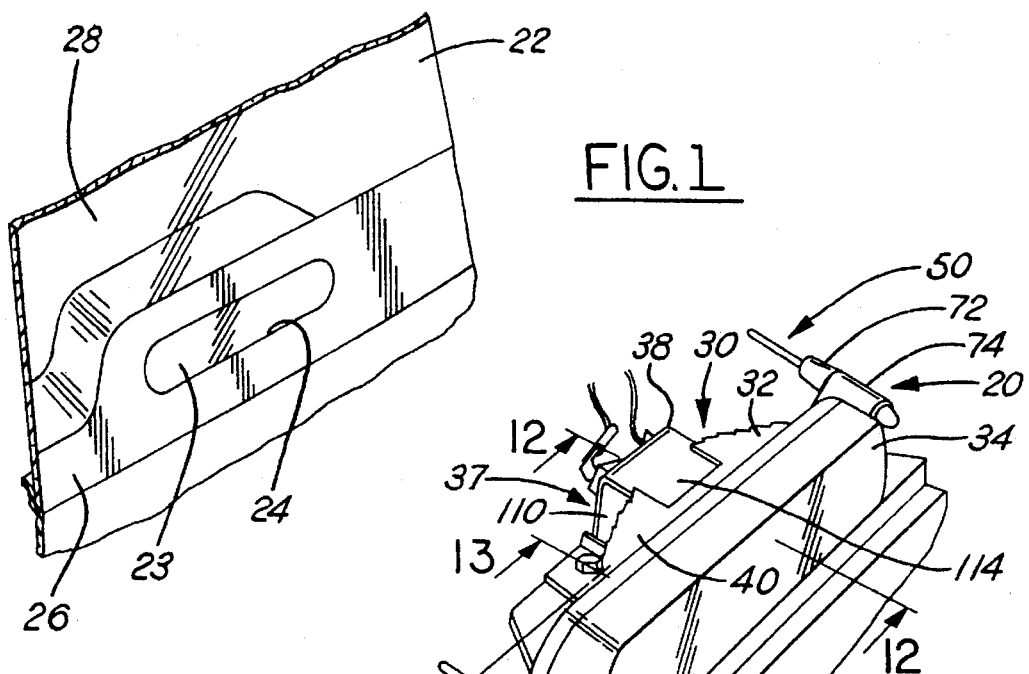
FIG. 1
FIG. 2
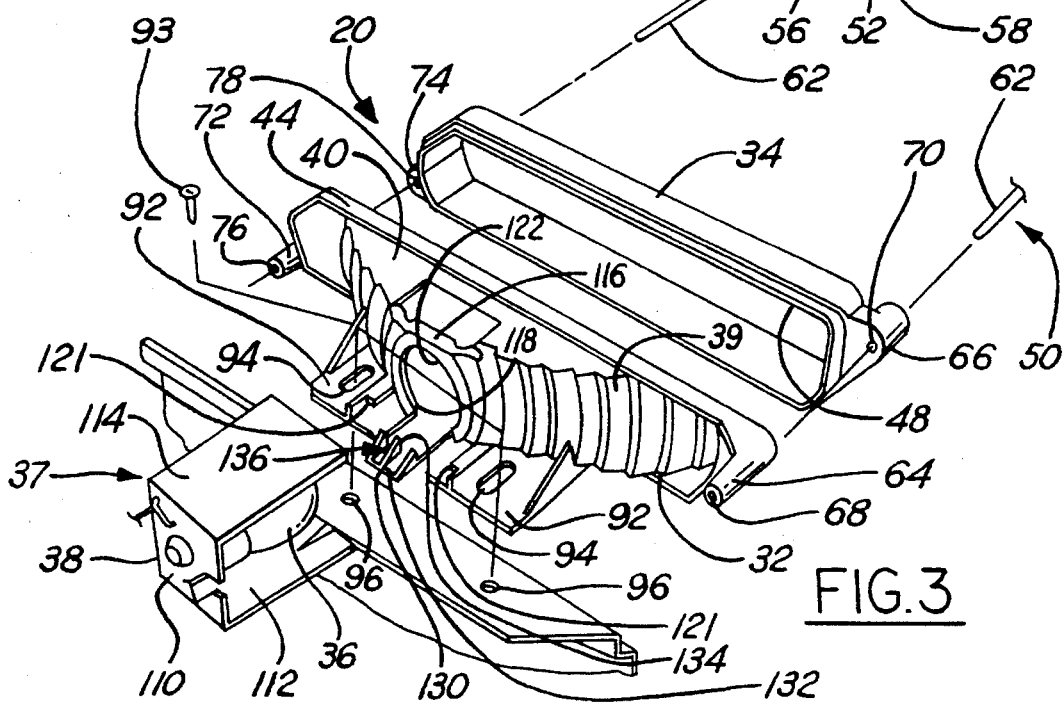
FIG. 3

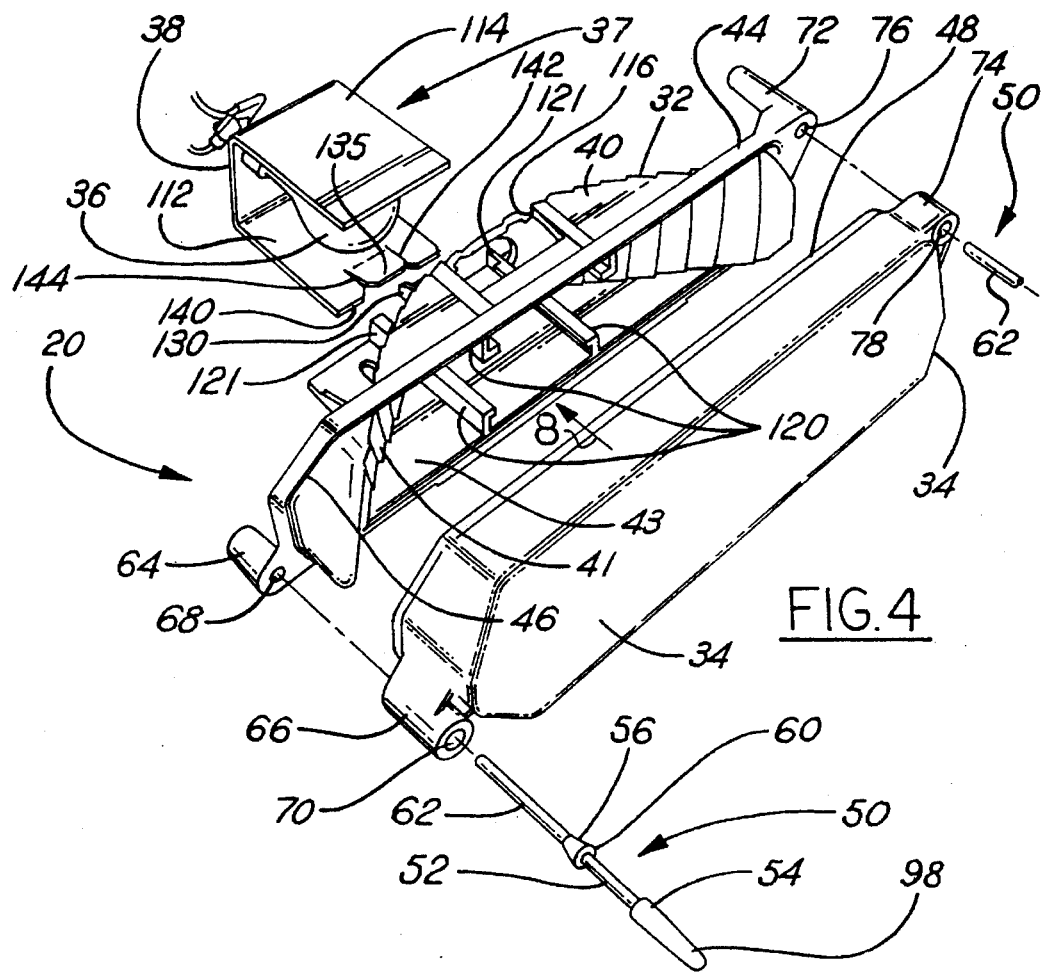
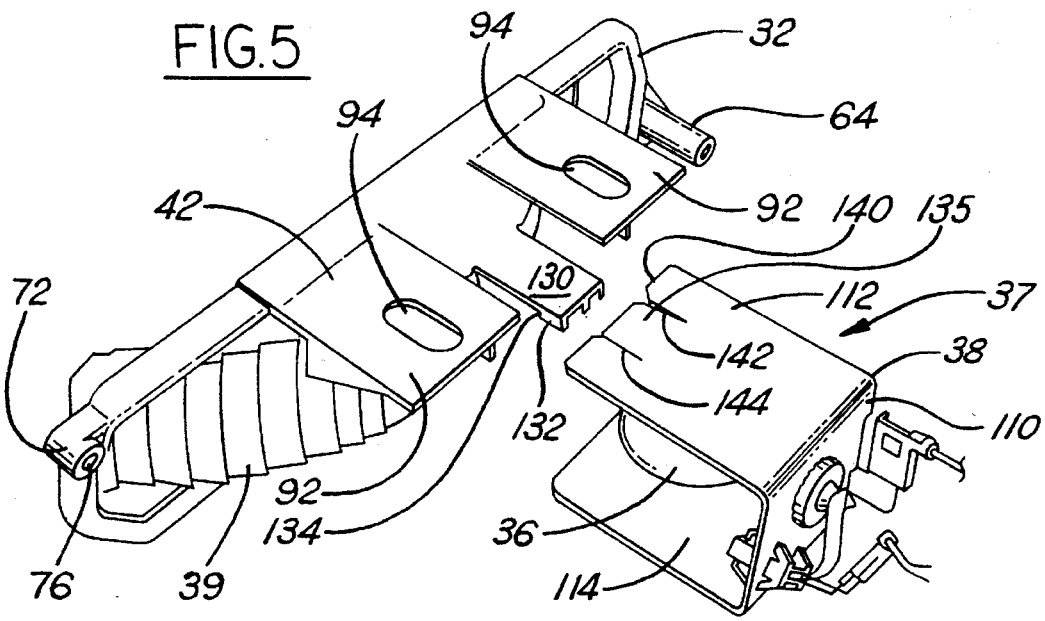

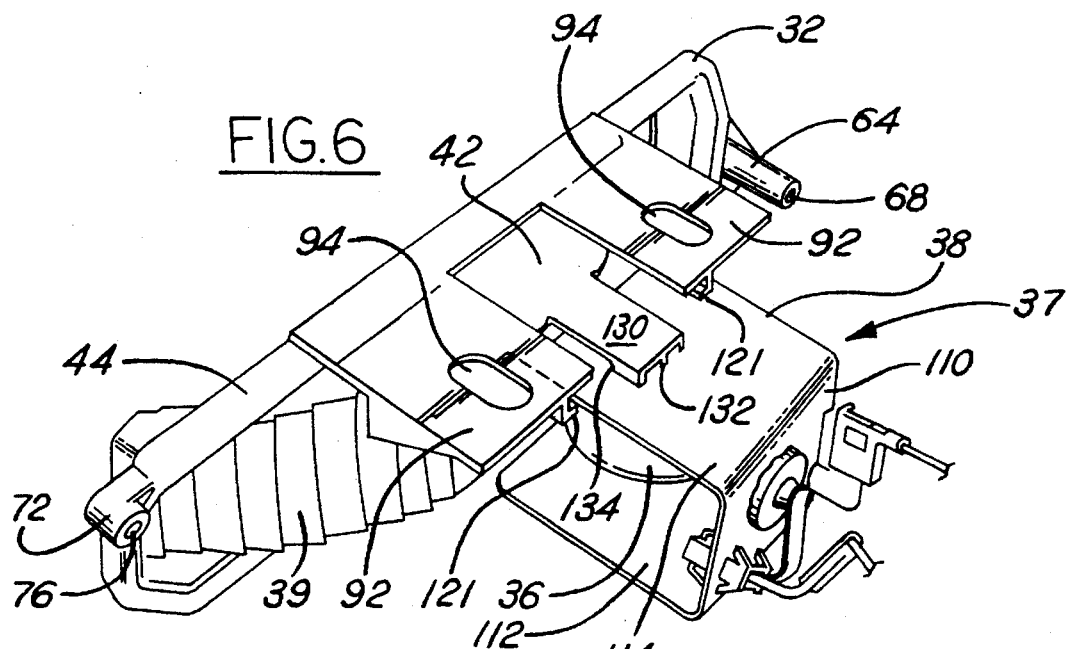
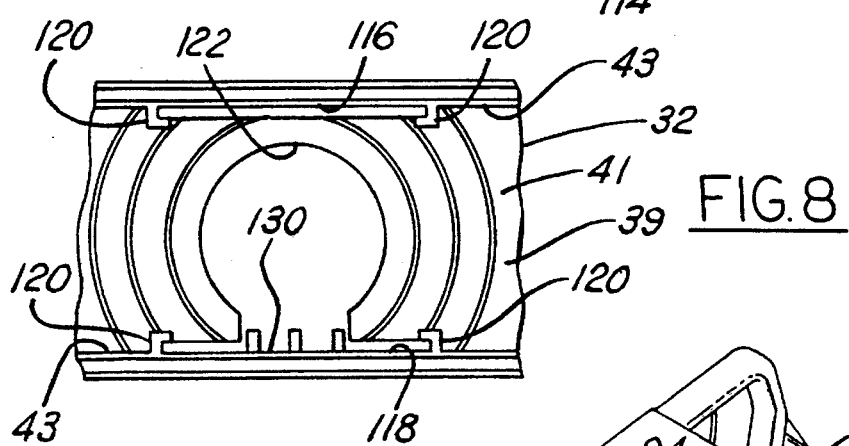
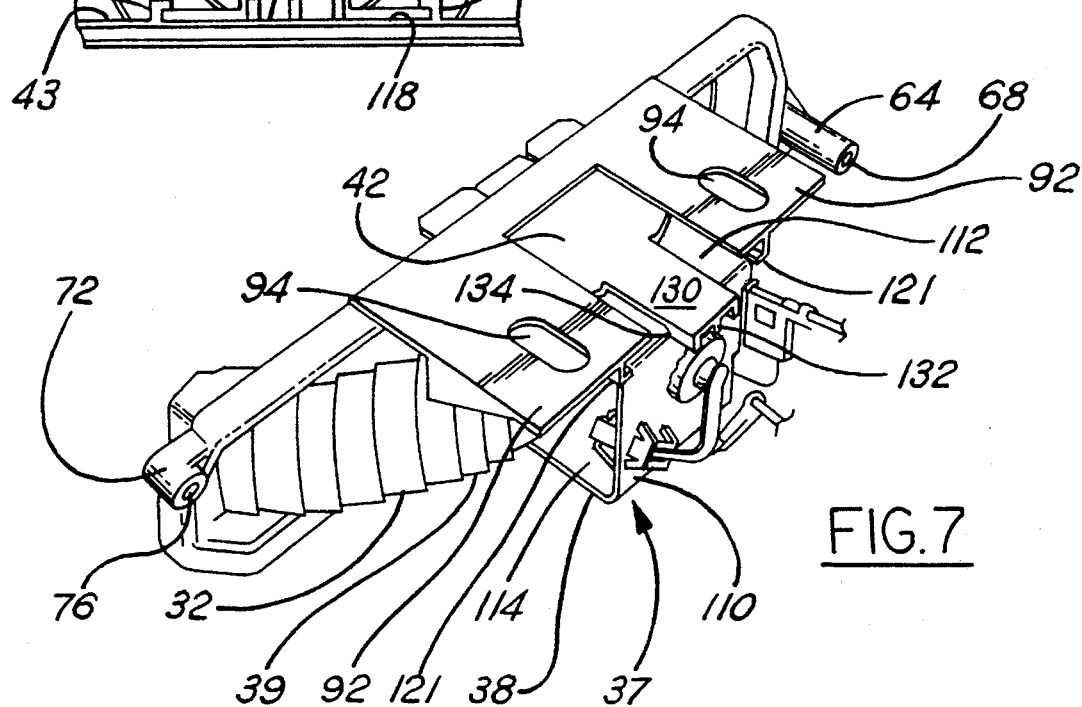

5,510,968

BACK LIGHT ASSEMBLY

FIELD OF THE INVENTION

This invention relates generally to light assemblies and more particularly to back light assemblies for automotive vehicles.

BACKGROUND OF THE INVENTION

The lens which forms a cover for the bulb chamber in the housing of a back light assembly is normally permanently secured to the housing as by welding. Expensive tooling is required. Also, the lens cannot readily be separated from the housing for recycling.

What is needed is an arrangement for releasably securing the lens to the housing, enabling it to be readily affixed and easily separated therefrom. This would eliminate expensive tooling for welding and also achieve more consistent quality. Also, there is a need for a releasable attachment for the light bulb in the housing and a heat shield to protect the housing from excessive heat generated by the bulb. In the past, two stamped parts were used for this purpose. The present invention provides a unique attachment combining both features. This reduces manufacturing cost and assembly cost. This attachment also should be releasable, easy to attach and separate from the housing for repair, replacement and ultimate recycling of the parts.

SUMMARY OF THE INVENTION

In accordance with the present invention, the housing for the light bulb preferably comprises two separable housing parts, one of which is the lens, what are secured together by at least one and preferably two elongated, flexible, compressible, stretchable fasteners. Each fastener extends through aligned passages in the housing parts.

Each fastener also preferably has a pair of enlargements, one engageable with an abutment in the passage in one housing part and the other engageable with an abutment in the passage in the other housing part to hold the housing parts together. When the fasteners are installed, they are preferably stretched and in tension to hold the housing parts together securely and without any rattles or noise of any kind.

The fasteners are preferably designed with a stem extension at one end which can be grasped and pulled, enabling the fasteners to be easily inserted endwise into the passages. Preferably, one of the enlargements of each fastener is adapted to make engagement with the rear window of the vehicle as a gage to provide an indication that the back light assembly is installed in the correct position.

Preferably, the light bulb assembly comprises a generally channel-shaped supporting frame having opposite side flanges which extend through slots in the front wall of the housing into the housing chamber. A light bulb mounted on the base of the frame extends through an aperture in the front wall into the chamber. The light bulb assembly is preferably releasably retained by a flexibly resilient clip on the housing which has a latching element providing a shoulder adapted to snap over the frame of the light bulb assembly. This latching element preferably has a camming portion adapted to be engaged by the frame of the light bulb assembly to cam the clip out of the way during assembly.

One object of this invention is to provide a back light assembly having the foregoing features and capabilities.

Another object is to provide a back light assembly which is composed of a relatively few simple parts, is rugged and durable in use, and is capable of inexpensive manufacture, assembly, and disassembly.

Other objects, features and advantages of the invention will become more apparent as the following description proceeds, especially when considered with the accompanying drawings.

BRIEF DESCRIPTION OF THE DRAWINGS

FIG. 1 is a fragmentary perspective view looking into the rear window of a motor vehicle from the outside, and showing a portion of the lens of a back light assembly constructed in accordance with the invention.

FIG. 2 is a perspective view of the back light assembly of this invention.

FIG. 3 is an exploded perspective view of the back light assembly.

FIG. 4 is an exploded perspective view of the back light assembly, as seen from a different angle.

FIG. 5 is an exploded perspective view showing a part of the housing and the light bulb assembly.

FIG. 6 is a view similar to FIG. 5, but with the light bulb assembly partially assembled with the housing part.

FIG. 7 is a view similar to FIGS. 5 and 6, but with the parts fully assembled.

FIG. 8 is a fragmentary elevation of the inside of the central portion of one of the housing parts, taken in the direction of the arrow 8 in FIG. 4.

DETAILED DESCRIPTION OF THE PREFERRED EMBODIMENT

Figure 9:
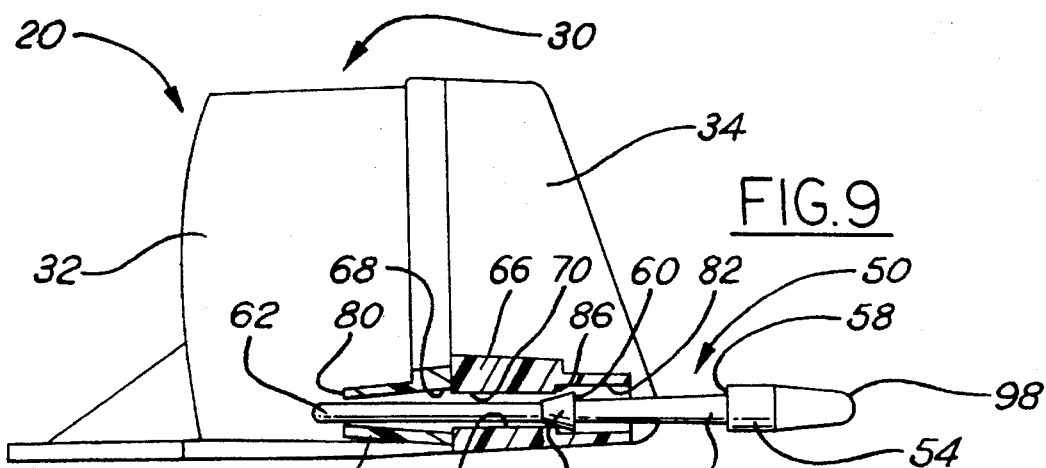
FIG. 9 is a side view of the back light assembly with parts in section, showing a fastener partially inserted into aligned passages in the housing parts.

Referring now more particularly to the drawings, FIG. 1 shows the back light assembly 20 as it appears to a viewer on the outside of a vehicle looking through the rear window 22. Actually, what is seen is only a portion 23 of the rear wall of the translucent lens of the back light assembly within the elongated oval 24. The portion 26 of the window surrounding this oval is painted black so that the remaining portions of the back light assembly cannot be seen. The numeral 28 indicates trim which covers the top, sides and front portions of the back light assembly.

The back light assembly 20 comprises a housing 30 having an elongated front housing part 32, which may be considered the housing proper, and an elongated rear housing part or lens 34. The housing parts 32 and 34 are releasably secured together to provide a chamber 35 for a light bulb 36. The light bulb is carried by a light bulb assembly 37 which includes the bulb 36 and a supporting frame 38.

The front housing part 32 has an elongated front wall 39 which tapers rearwardly in steps as shown in FIGS. 3 and 5–7. The front housing part 32 has parallel side walls 40 and 42 which extend rearwardly from the side edges of the front wall 39. The housing is horizontally elongated and when installed in the vehicle the sidewalls 40 and 42 extend along the top and bottom of the front wall 39 of the housing. The front housing part 32 has a rearward extension or mouth 44 formed with an annular groove 46. The lens 34 has a forwardly turned annular marginal edge 48 which fits into the groove 46 when the parts are assembled together.

A pair of identical elongated fasteners 50 releasably hold the front housing part 32 and the rear housing part or lens 34 together. Each fastener is preferably made of a flexible, compressible, stretchable elastomeric material such as natural or synthetic rubber. Each fastener has an elongated mid-section 52 with enlargements 54 and 56 at each end of the mid-section.

The enlargement 54 is at one extremity of the fastener and has a radially outwardly extending shoulder 58 at its juncture with the mid-section which is perpendicular to the mid-section and to the longitudinal centerline of the fastener. The other enlargement 56 has a radially outwardly extending shoulder 60 at its juncture with the mid-section which is perpendicular to the mid-section and to the longitudinal centerline of the fastener. The shoulders 58 and 60 face toward one another. The enlargement 55 is a frustum of a cone and has a radially outer surface which tapers away from the enlargement 54.

A stem 62 extends from the enlargement 56 to the opposite extremity of the fastener. The stem 62 is for the purpose of pulling the fastener through aligned passages in the housing parts into a fully installed position, as will be more fully described hereinafter.

The housing parts 32 and 34 have at one end the elongated generally barrel-shaped abutting formations 64 and 66 providing aligned, elongated, open-ended passages 68 and 70. The housing parts 32 and 34 have at the opposite end the elongated, generally barrel-shaped abutting formations 72 and 74 providing aligned, elongated, open-ended passages 76 and 78. Passages 68,70 and 76,78 extend transversely of the housing 30, and longitudinally of the vehicle when the housing is properly installed.

The passages 68,70 on one side of the housing are identical to the passages 76,78 on the opposite side and hence a description of the passages 68,70 will serve as a description of passages 76,78 as well.

Figure 10:
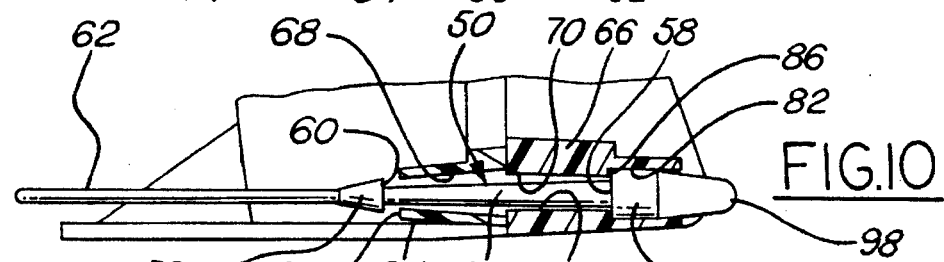
FIG. 10 is similar to FIG. 9, but shows the fastener after it has been fully inserted into the aligned passages by pulling on the stem of the fastener, but before the pulling force on the fastener is released.
Figure 11:
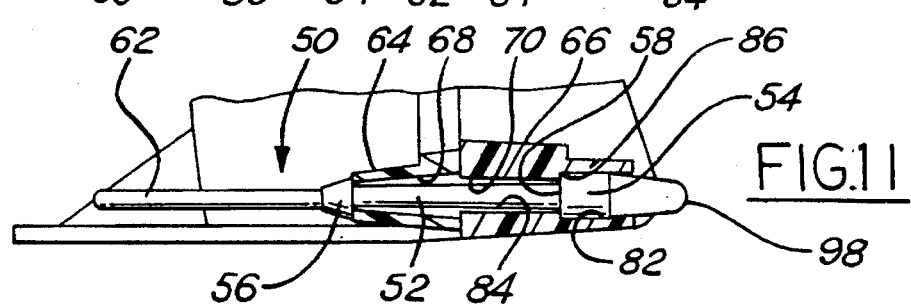
FIG. 11 is similar to FIG. 10, but after the pulling force on the stem of the fastener has been released, showing the housing parts releasably secured together and the fastener stretched and in tension.
Figure 12:
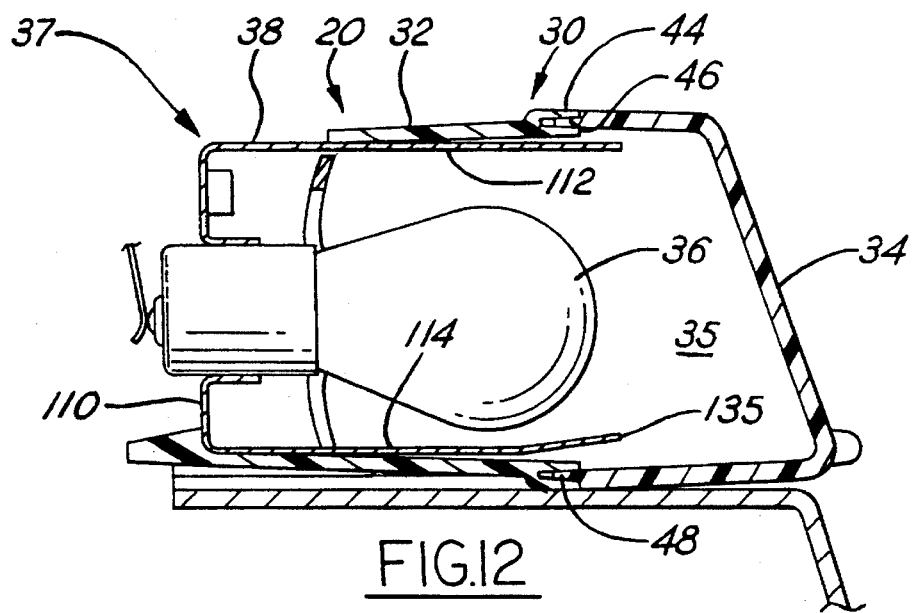
FIG. 12 is a sectional view taken on the line 12—12 in FIG. 2.

Referring to FIGS. 9–11, the passage 68 in the housing part 32 is circular throughout its length, but tapers radially inwardly from rear to front. At its rear end it is larger in diameter than the large end of the enlargement 56, but at its front end 80 it is smaller in diameter than the large end of enlargement 56. The front end 80 provides an annular, radial abutment.

The passage 70 has a large diameter cylindrical portion 82 at the rear end and a small diameter portion 84 at its front end, with a shoulder between the portions 82 and 84 providing a radial, annular abutment 86. The distance between abutments 80 and 86 is less than the length of the mid-section 52 of the fastener in its free or unstretched condition. Abutments 80 and 86 face away from one another. The portion 84 may be cylindrical or preferably slightly tapered in a rearward direction, as shown. The large diameter portion 82 is larger than the maximum diameter of fastener enlargement 56 and slightly larger than the fastener enlargement 54 so that enlargement 54 may have a sliding fit therein, but its shoulder 58 will contact the abutment 86. The abutment 86 has a slightly smaller minimum diameter than enlargement 56.

The fastener 50 is installed in the aligned passages 68,70 by inserting the stem 62 endwise into the rear end of passage 70 and pushing it leftward in FIG. 9 to the position shown. The end of stem 62 may then be grasped and the fastener pulled to the FIG. 10 position in which the enlargement 54 engages abutment 86. To reach the FIG. 10 position, the fastener enlargement 54 must compress slightly to pass abutment 86 and also compress to pass abutment 80, stretching and elongating the fastener in the pulling process. The stretching of the fastener also makes the enlargement 54 smaller so that it more readily passes the abutments. When the stem is released as in FIG. 11, the enlargements 54 and 56 engage the respective abutments 86 and 80 and the mid-section 52 between the abutments is stretched and elongated in tension because the distance between the enlargements 54 and 56 in the unstretched condition of the fastener is less than the distance between the abutments. The housing parts 32 and 34 are thus firmly held together without rattling or noise of any kind.

Each fastener 50 can be removed to permit separation of the housing parts by manually squeezing and compressing the enlargement 56 so that it clears the abutment 80 and then grasping the enlargement 54 and pulling the fastener to the right in FIGS. 9–11 to withdraw the fastener from the passages 68 and 78.

Figure 13:
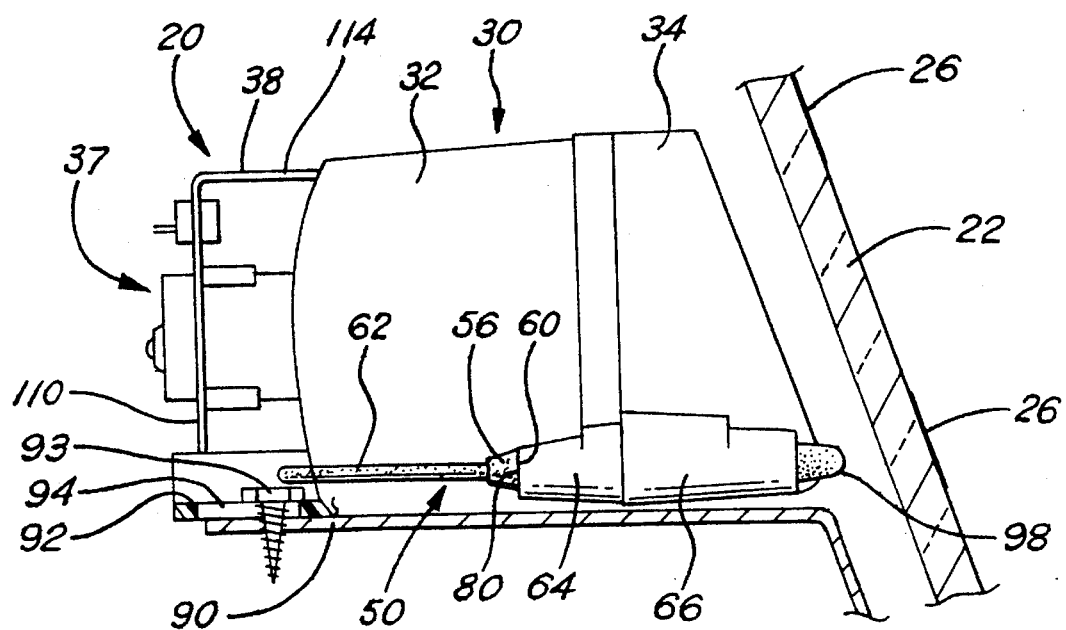
FIG. 13 is a side view, with part in section, taken on the line 13—13 in FIG. 2, and showing the back light assembly spaced forwardly from the rear window of the vehicle before it is installed in the correct position.
Figure 14:
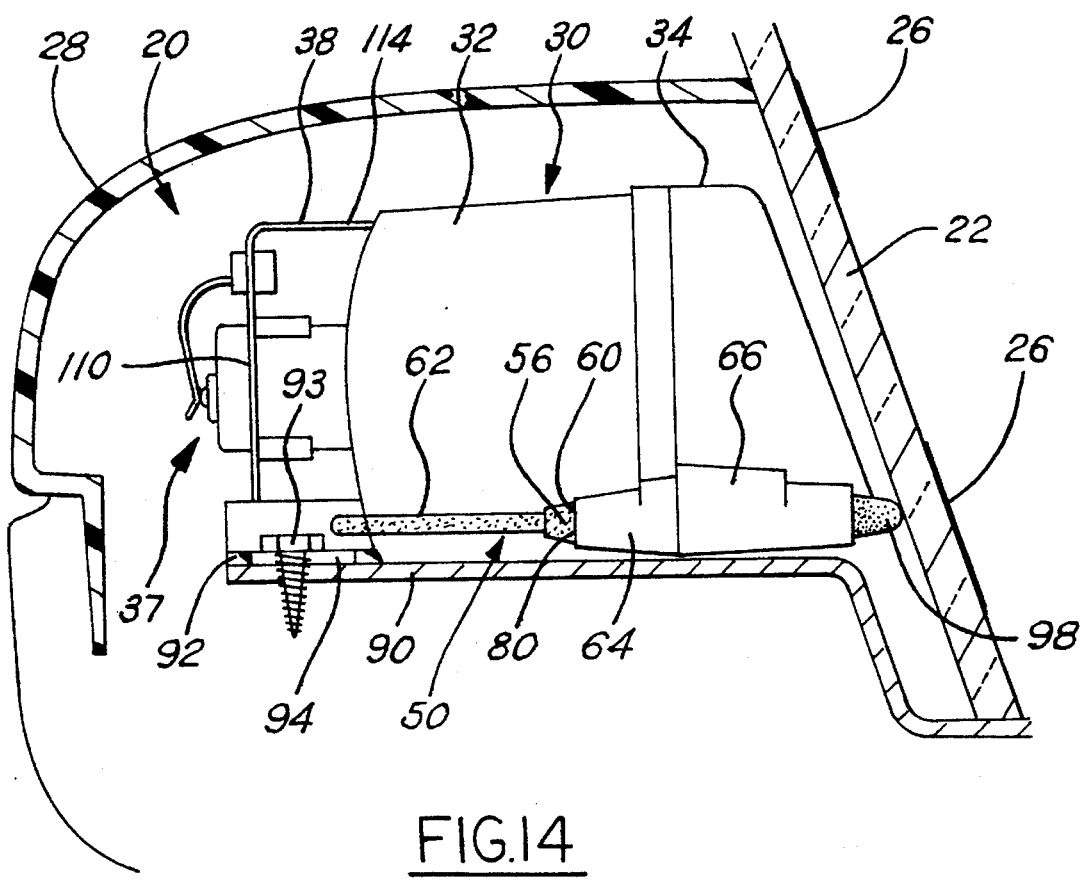
FIG. 14 is similar to FIG. 13, but shows the back light assembly in its properly installed position, in which a bumper extension on one of the fasteners contacts the rear window.

The back light assembly is adapted to be mounted in front of the rear window 22 of the vehicle on a fixed horizontal base 90 (FIGS. 13,14). The horizontal side wall 42 of the housing has horizontal, laterally spaced, parallel extension plates 92 which rest on the base 90 and are releasably secured thereto by threaded fasteners 93 extending through holes 94 in the extension plates and holes 96 in the base. See FIGS. 3, 5–7, 13 and 14. The holes 94 are elongated in a direction lengthwise of the vehicle, that is, toward and away from the rear window, to allow for adjustment in the position of the back light assembly. The fastener enlargements 54 have extensions 98 which serve as bumpers that are adapted to contact the rear window when the back light assembly is mounted in the correct position. The bumpers also stabilize the assembly and dampen or eliminate noise.

The frame 38 of the light bulb assembly 37 is channel-shaped, having a base 110 and parallel side flanges 112 and 114 extending from the side edges of the base and perpendicular thereto. The light bulb 36 is secured to the base 110 between the side flanges 112 and 114. See FIGS. 2–7.

The front wall 39 of the front housing part 32 of housing 30 has two centrally located, parallel, laterally extending slots 116 and 118 along the opposite side edges thereof, adjacent to and parallel to the side walls 40 and 42. The side flanges 112 and 114 of the frame 38 extend into the respective slots 116 and 118 along the inner sides of the side walls 40 and 42. The inner sides of the side walls 40 and 42 have laterally spaced, parallel guide rails 120 which slidably engage the parallel opposite side edges of the side flanges 112 and 114 so that the side flanges can be guided into position within housing 30 during insertion through slots 116 and 118 as the frame is assembled with the housing by a movement from left to right in FIG. 3. The extension plates 92 have rails 121 which serve as extensions of the guide rails 120 on side wall 42. When fully assembled with the housing, the base 110 of the frame 38 is disposed in spaced relation to the front wall 39 of the front housing part 32, forwardly thereof, in overlying relation to an aperture 122 in the front wall 39. Aperture 122 is between slots 116 and 118 in the front wall 39. In this position, the light bulb 36 extends into the chamber 35 of the housing through aperture 122. The side flanges 112 and 114 are of a suitable material to form a heat shield on opposite sides of the bulb.

The light bulb assembly 37 is releasably retained in assembled relation with the housing by means including an elongated, flexibly resilient clip 130. The clip 130 is integrally joined at one end to the side wall 42 between the extension plates 92. The free end of the clip has an integral latching element 132 formed with a shoulder 134 which is adapted to snap over the base 110 of frame 38 of the light bulb assembly 37 when the frame is fully inserted into and assembled with the housing 30. The latching element 132 has an inclined camming portion 136 outwardly beyond the shoulder 134 which is engaged by a central marginal edge portion 135 of the side flange 112 of the frame during assembly, to cam the clip out of the way and allow the frame 38 to be moved into fully assembled position. The extensions 121 of the guide rails 120 on side wall 42 guide the opposite side edges of the side flange 112 of the frame 38 during the initial movement of the light bulb assembly 37 into assembled relation with the housing part 32. The light bulb assembly 37 can be separated from the housing 30 by manually retracting the clip 130 to release the frame 38.

The transverse edge 140 of side flange 112 is slit along parallel lines 142 and 144 to define the central marginal edge portion 135 between the slits and make it more flexible and facilitate flexing of the clip out of the way during assembly. The marginal edge portion 135 is bent inwardly slightly toward side flange 114, to assist in clearing the clip 130 during assembly of the light bulb assembly 37 with housing 39.

FIG. 5 shows the housing part 32 and light bulb assembly 37 prior to assembly, with the light bulb assembly spaced forwardly, or on the outer side of the front wall 39. FIG. 6 shows the housing part 32 and light bulb assembly 37 partially assembled, and FIG. 7 shows them fully assembled with the shoulder 134 of clip 130 snapped over the base 110 of frame 38. During assembly, the light bulb moves into the chamber 35 of the housing 30 through the aperture 120. These parts are easily assembled by pushing them together as shown in FIGS. 5–7, and just as easily disassembled by retracting clip 130.

What is claimed is:

1. A back light assembly for an automotive vehicle comprising a housing defining an inner chamber, said housing having a front wall and a translucent rear wall, said front wall having an aperture therein and also having opposite side edges, said walls extending rearwardly from the respective side edges of said front wall, slots in the front wall of said housing adjacent to the respective side edges thereof, a light bulb assembly comprising a supporting frame, said supporting frame being generally channel-shaped including a base having opposite side edges, side flanges extending rearwardly from the respective side edges of said base, the base of said frame being disposed forwardly of the front wall of said housing across the aperture therein, said side flanges extending through said slots into said chamber along the side walls of said housing, a light bulb mounted on the base of said frame and extending through said aperture into said chamber, the side flanges of said frame form a heat shield on opposite sides of the light bulb, and means securing said light bulb assembly to said housing.

2. A back light assembly as defined in claim 1, wherein said means securing said light bulb assembly to said housing comprises a clip having a first end affixed to said housing and a second end engaging said frame.

3. A back light assembly as defined in claim 2, wherein said clip is flexibly resilient and has a latching portion formed with a shoulder having a snap engagement with said frame.

4. A back light assembly as defined in claim 2, wherein said side walls of said housing have guides for slidably receiving said flanges of said housing, said light bulb assembly being assembled with said housing by (1) placing said light bulb assembly forwardly of said housing, (2) extending the side flanges of said frame through said slots, and (3) moving said light bulb assembly rearwardly until said side flanges are engaged with said guides, and said means securing said light bulb assembly to said housing comprising a flexibly resilient clip having a first end integrally affixed to said housing and a second end having a latching element providing a shoulder snapped over said frame, said latching element having a camming portion adapted to be engaged by said frame to cam said clip away from said frame during assembly of said light bulb assembly as aforesaid.

5. A back light assembly as defined in claim 4, wherein one of the said flanges of said frame is slit to provide a flexible marginal edge portion engageable with said camming portion to facilitate flexing of said clip out of the way during assembly of said light bulb assembly with said housing.

6. A back light assembly as defined in claim 5, wherein said flexible marginal edge portion of said one side flange is bent inwardly toward the other of said side flanges to assist in clearing the clip during assembly.

7. A back light assembly as defined in claim 6, wherein said housing has guide extensions outside said chamber and aligned with the guides on at least one of said side walls to facilitate assembly of said light bulb assembly with said housing.

* * * * *